United States Patent [19]

Arbaud

[11] 3,901,648

[45] Aug. 26, 1975

[54] COMPOSITION FOR THE COLOURATION OF POLYURETHANES

[75] Inventor: Paul Georges Louis Arbaud, Chantilly, France

[73] Assignee: Ugine Kuhlmann, Paris, France

[22] Filed: Mar. 19, 1973

[21] Appl. No.: 342,564

Related U.S. Application Data

[63] Continuation of Ser. No. 133,439, April 12, 1971, abandoned.

[30] Foreign Application Priority Data

Nov. 20, 1970 France .............................. 70.41760

[52] U.S. Cl. .............................. 8/4; 8/178 E; 8/172; 8/173; 8/174; 8/175
[51] Int. Cl. .............................................. D06p 3/24
[58] Field of Search .............................. 8/4, 178 E

[56] References Cited
UNITED STATES PATENTS 3,502,493 3/1970 Akamatsu .............................. 117/38
3,510,243 5/1970 Seuret et al. .......................... 8/174 X
3,607,358 9/1971 Dangl et al. .......................... 8/178 E

FOREIGN PATENTS OR APPLICATIONS 6,503,750 3/1965 Netherlands .............................. 8/4

OTHER PUBLICATIONS

Souther, "American Dyestuff Reporter," Jan. 1970, pages 23–27, TP890A512.
Faber, "American Dyestuff Reporter," Nov., 18, 1968, page 934–937, TP890A512.

*Primary Examiner*—Donald Levy

[57] ABSTRACT

Colouring composition comprising 1 to 20% of a dyestuff soluble in alcohols, 10 to 85% of a solvent containing an alcoholic function, 1 to 35% of a polar and aprotic solvent, 1 to 50% of an organic solvent not containing a hydroxy group, 0 to 2.5% of a film-forming product and 0 to 10% of water. These compositions are suitable for the colouration of a polyurethane or a polymer based on a polyurethane.

5 Claims, No Drawings

COMPOSITION FOR THE COLOURATION OF POLYURETHANES

This is a continuation of application Ser. No. 133,439, filed Apr. 12, 1971, now abandoned. The invention relates to compositions for the colouration of polyurethanes.

Polyurethanes and polymers based on polyurethanes such as polyurethane-polyureas, are used for the manufacture of foams, the coating of textiles and the facing of leather and skins. The colouration of these materials or these coatings has previously been obtained either by pigmentation in the bulk material by means of dispersions of pigments, or by colouration of the bulk material by means of solutions of dyestuffs in their preferred solvents, or by the formation of a coloured layer based on polyester, nitrocellulose, or plastic resin. In this case, the coloured layer and the polyurethane support appear as two distinct superposed layers.

When solutions are used to colour the bulk material, the choice of the solvent depends on the nature of the dyestuff, the degree of solubility of the latter in the solvent, the reactivity of the solvent with the prepolymer of the polyurethane, the polyisocyanate or the hardener. In these conditions it is difficult to obtain satisfactory results with regard to the strength of colour, the depth of the shade, the mechanical qualities and the outward appearance of the material at one and the same time. In this connection it is important that the colouration should be quite uniform and that the surface should be flawless (without bubbles, craters).

According to the present invention colouring compositions are provided comprising:
1 to 20% of a dyestuff soluble in alcohols
10 to 85% of a solvent with an alcoholic function
1 to 35% of a polar and aprotic solvent
1 to 50% of an organic solvent not containing a hydroxy group
0 to 2.5% of a film-forming product
0 to 10% of water.

Examples of dyestuffs soluble in alcohols are the metalliferous complexes of azo dyestuffs of the 1:2 type and the salts of acid dyestuffs, containing sulphonic groups, with amines of high molecular weight. The metalliferous complexes of the 1:2 type contain an atom of the complexing metal to two molecules of azo dyestuff and these molecules may be the same or different. The metal may be, for example, chromium, cobalt, nickel, iron, copper, manganese or aluminium. If desired they may be converted into salts by bases which may or may not have the characteristics of dyestuffs. Examples of acid dyestuffs containing sulphonic groups converted into salts by organic bases are those belonging to the azo dyestuff series and the phthalocyanine series. The amines which form salts with the sulphonic groups are amines of high molecular weight. Among others, there may be mentioned the long-chain aliphatic amines containing, for example, 8 to 20 carbon atoms such as those of the "Noram" type, the arylamines, diarylguanidines such as diphenyl-, ditolyl-, or phenyltolylguanidines, and rosinamines. The amine itself may have the characteristics of a dyestuff, this being the case, for example, with the rhodamines.

The dyestuffs of the invention are soluble in solvents having alcoholic functions such as, for example, methanol, ethanol, propanol, isopropanol, butanol, isobutanol, isoamyl alcohol, benzyl alcohol, cyclohexanol, diacetonealcohol, ethyleneglycol, propyleneglycol, hexyleneglycol, glycerol, diethyleneglycol, monomethyl and monoethyl ethers of ethylene glycol, and the monoethyl ether of triethyleneglycol. The preferred alcoholic compounds are those having a boiling point less than 140°C.

The polar and aprotic solvents constitute a class of solvents of a known type (A. J. Parker, Quarterly Reviews, 1962, Page 163). The most well known are, for example, dimethylformamide, dimethylsulphoxide, diethylsulphoxide, dimethylacetamide, and tetrahydrofuran. A solvent or a mixture of solvents having a boiling point less than 160°C. is preferably used.

Examples of organic solvents containing no hydroxy groups are hydrocarbons and their substituted derivatives such as hexane, heptane, low boiling gasoline, kerosene, benzene, toluene, xylene, chlorobenzene, cyclohexane, trichloroethylene, tetrachloroethylene, or nitropropane, esters such as methyl, ethyl, propyl, isopropyl, butyl, amyl or isoamyl acetates and acetates of the monomethyl and monoethyl ethers of ethyleneglycol, ketones such as acetone, methylethylketone, methylisobutylketone, ethylamylketone, cyclohexanone, methylcyclohexanone, or isophorone, and dioxan. Mixtures of these solvents in any proportions, preferably mixtures having a boiling point less than 100°C., may also be used.

The compositions according to the invention may if desired contain film-forming substances, for example, cellulosic derivatives such as cellulose esters, especially cellulose acetate and cellulose acetobutyrate, cellulose ethers, especially the ethyl and benzyl ethers, nitrocellulose, natural or synthetic waxes such as carnauba wax, oricury wax, Japan wax, beeswax, gum lac wax, polyethylene wax, colophony, prepolymers of polyurethane of the polyether-polyurethane or polyester-polyurethane type, glycerophthalic or oleoglycerophthalic derivatives such as those used for paints and varnishes, vinyl derivatives such as vinyl acetate and vinyl chloride, aminoplast or phenoplast resins.

The compositions according to the invention may be prepared, for example, by mixing a solution of the dyestuff in the solvent with an alcoholic function with the polar and aprotic solvent, and diluting the solution obtained with the organic solvent containing no hydroxy groups. The compositions containing a film-forming product may be prepared, for example, by adding to the alcoholic solution of the dyestuff in the polar and aprotic solvent the solution of the film-forming product in the organic solvent containing no hydroxy groups, or an aqueous emulsion of the "oil-in-water" or "water-in-oil" type of the film-forming derivative and of the organic solvent containing no hydroxy groups, possibly in the presence of a hydroxylated solvent, the proportion of water in the aqueous emulsion being suitably from 0.5 to 40%.

The colouring compositions according to the invention may be applied to polyurethanes or polyurethane-polyureas, after complete maturing of the polymers or copolymers, by spraying, dipping, spreading or brushing. The compositions may be used at the ambient temperature or may be conditioned at a temperature up to 50°C. The material is then dried at the ambient temperature or at a temperature up to 60°C. Uniform shades which are fast to dry and wet rubbing are obtained. The compositions according to the invention enable colourations to be obtained which are not only superficial but which show a good penetration into the mass of the material. On the other hand, contrary to all expectations it has been found that the use of the film-forming derivative does not give rise to a superposed layer effect. The risk of splitting is therefore absent.

In order to improve, if necessary, the feel and the suppleness of the film-forming coating, plasticisers may also be added to the compositions according to the invention such as, for example, camphor, castor oil, tricresyl phosphate, butyl phthalate or softeners such as, for example, quaternary ammonium salts with a fatty radical, silicone oils, saturated or unsaturated fatty acids in an organic solution.

The following Examples, in which the parts are parts by weight unless the contrary is indicated, illustrate the invention without restricting it.

test of resistance to abrasion was effected on the same apparatus and corresponds to a rubbing back and forth without load with a rounded peak of 0.9 mm in diameter.

The figures given are based on 10.

10 = no damage or faultless
0 = considerable damage or numerous defects

|  | 1 | 2 | 3 | 4 |
|---|---|---|---|---|
| Appearance | 10 | 5 (lack of uniformity bronze colouring) | 10 (not coloured) | 2 (blisters separation) |
| Resistance to dry rubbing | 10 | 0 | 10 " | 10 " |
| Resistance to wet rubbing | 9–10 | 0 | 10 " | 10 " |
| Resistance to abrasion | 10 | 1 | 4 | 8 (blisters) |
| % penetration of the tinctorial solution | 25% | 4–10% | — | — |
| Visible presence of a film or deposit in juxtaposition | no | yes | yes | no |
| Resistance on the Bally flexometer in number of bends (untreated control: 22,000) | 25,000 | 23,000 | 15,000 | 8,000 |

EXAMPLE 1

A solution of 30 parts of a rhodamine salt of [2-(1-hydroxy-1-ethylidene)-acetanilide] -<2azo 1>-[2-hydroxy-5-nitro-benzene-3-sulphonic] acid in the form of a 1:1 chromium complex in 1000 parts of the monomethyl ether of ethyleneglycol is prepared in the cold.

After standing for 12 hours, 100 parts of dimethyl formamide and 150 parts of the solution of nitrocellulose prepared separately as follows are added to the above solution:

| nitrocellulose 80 E | 2.5 | parts |
| nitrocellulose 130 E | 3 | " |
| camphor | 0.6 | " |
| castor oil | 0.9 | " |
| toluene | 70 | " |
| denatured ethyl alcohol | 11 | " |
| butyl (or ethyl) acetate | 40 | " |
| methylethylketone | 22 | " |

Then by means of an aerograph gun, under a pressure of 3 kg/cm² and at a distance of 40 cm., 50 g per square metre of the solution thus defined are applied to a leather covered with a layer of a polyurethane-polyurea elastomer 2/10 mm in thickness, according to the technique and with the composition described in Example 4 of French Pat. No. 1,427,722.

After drying for an hour at ambient temperature, the coating (1) obtained is compared with that of the same leather treated with the same quantity of the solution of the same dyestuff at the same concentration in the methyl ether of ethyleneglycol alone (2), of the solution of the lac alone (3), of the dimethyl formamide alone (4).

The tests on fastness to wet and dry rubbing were carried out in a VESLIC crockmeter and corresponded to 10 rubbings back and forth with a load of 500 g. The

EXAMPLE 2

A solution of 70 parts of the 1:2 chromium complex of [5-nitro-2-hydroxy-benzene] - <1 azo 1> - [2-hydroxy-naphthalene] and of [4-nitro-2-hydroxybenzene] - <1azo 1> - [2-hydroxynaphthalene] in 1000 parts of a mixture comprising one-third of 87% ethyl alcohol, one-third of the monomethyl ether of ethyleneglycol and one-third of ethyleneglycol, is prepared at 40°C.

After cooling to 30°C. there are added to this solution 150 parts of dimethylsulphoxide taken to 30°C. by heating in an oven and 150 parts of an aqueous emulsion of nitrocellulose comprising the following components:

| nitrocellulose | 20 parts |
| non-ionic emulsifier | 5 parts |
| a 20% dry extract of a quaternary ammonium salt obtained from diethanolamine, stearyl alcohol and glycerol epichlorhydrin | 2 parts |
| ethyl acetate | 10 parts |
| diisobutylketone | 8 parts |
| butyl (or ethyl) acetate | 10 parts |
| butyl alcohol | 2 parts |
| distilled water | 30 parts |
| toluene | 13 parts |

40 g. per square metre of this solution are applied by means of a brush on the coated face of a jersey fabric covered to a thickness of 5/100 mm with a product resulting from the reaction of a polyester and prepolymers of polyurethane.

After drying for 25 minutes at 60°C. the dyed coating thus obtained corresponds to the following requirements:

| penetration | 75 to 90% |
| fastness to wet rubbing | 8 |
| fastness to dry rubbing | 10 |
| appearance | 10 |

EXAMPLE 3

The technique of Example 4 of French Pat. No. 1,427,722 is used with the composition of the said Example in which the prepolymer of polyurethane has been pigmented with yellow. There is thus applied on a strip of cowhide butt a layer of polyurethane-polyurea which reproduces a natural texture of chemically shrunk calfskin. It is left for 24 hours to allow the polyurethane-polyurea transferred to this skin to mature and a mixture comprising the following components is prepared:

| (a) | 1:2 chromium complex of 2'-carboxy-4-phenylazo-1-phenyl-3-methyl-5-hydroxypyrazole as the sodium salt | 30 parts |
|---|---|---|
| (b) | 1:2 chromium complex of 5'-nitro-2'-hydroxy-4-phenylazo-1-phenyl-3-methyl-5-hydroxy-pyrazole as the sodium salt | 15 parts |
| (c) | 1:2 chromium complex of Example 2 | 5 parts |
| (d) | ethylene glycol | 950 parts |

To this solution are added 250 parts of a polar and aprotic solvent of specific gravity 0.98, boiling point 160°C., flash point 57°C., known on the market by the name of URESOLVE PLUS. (Speed of evaporation greater than 1000).

To this solution are added on the one hand 75 parts of a solution of cellulose lacquer known commercially by the name Laque Lissanol I conc. and comprising a solution in an organic solvent of plasticised nitrocellulose (dry extract about 20%) and also 300 parts of ethyl acetate.

The final solution is applied with an aerograph gun regulated to a flat jet, inclined at 45° with respect to the plane of application. The rate of application is 70 g. to the square metre and one strives to reach only the top of the grains of the polyurethane-polyurea surface transferred on the leather.

The application is allowed to dry for two hours at ambient temperature. The coating shows an effect of two contrasted tints, brown on yellow, without separation or blistering. It is completely fast to dry and wet rubbing and to abrasion. In addition, it is not possible to distinguish the existence of two superposed films. The top of the grains is dyed in the mass up to 20% of its depth, although the measurement on the Bally flexometer has not changed (20,000).

EXAMPLE 4

In the casting of a wood sculpture in silicone elastomer, the mixture of the prepolymers of a rigid foam of polyurethane-polyurea is run in, according to the technique described in French Pat. Nos. 1,499,901–3.

After maturing and removing from the mould, a rigid panel is obtained reproducing the sculpture on the original wood; its appearance is yellowish and unequal.

A composition comprising the following components:

| Complex (a) of Example 3 | 30 parts |
|---|---|
| Complex (b) of Example 3 | 35 parts |
| Complex (c) of Example 3 | 20 parts |
| Monomethyl ether of ethyleneglycol | 500 parts |
| Dimethyl formamide | 500 parts |
| Ethyl acetate | 500 parts |
| Toluene | 500 parts |
| Aqueous emulsion of Carnauba wax, 10% dry extract | 100 parts |
| Solution of 6% dry extract of beeswax in oil of turpentine | 150 parts | is applied with a brush to the decorative face of this elastomer panel at the rate of 100 g. to the square metre. The panel is dried and polished with a felt cloth. A fumed "old oak" appearance is obtained. The coloured film is completely fast to dry rubbing, fast to light wet rubbing, and resistant to scratching with the finger nail.

EXAMPLE 5

The first starting material for colouring the leather defined in Example 3 is used. A month after the coating of polyurethane-polyurea elastomer has been made, there are applied with an aerograph gun at a pressure of 3 kg/cm$^2$, 135 g. to the square metre of a solution prepared in the cold and comprising the following components:

| Iron complex of [3,5-dinitro-2-hydroxybenzene]-<1 azo 4>-[2,5-dihydroxy-benzene]-<1 azo 1>-[2-sulpho-4-nitro-benzene] in the form of an arylguanidine sulphonate | 30 parts |
|---|---|
| Monomethyl ether of ethyleneglycol | 640 parts |
| Dimethyl formamide | 50 parts |
| Butyl (or ethyl) acetate | 25 parts |
| Methylethylketone | 21 parts |
| Ethyleneglycol | 25 parts |
| Ethyl alcohol | 59 parts |
| Methyl alcohol | 2 parts |
| Butyl alcohol | 21 parts |
| Toluene | 127 parts |
| | 1000 parts |

The leather is allowed to dry for 10 minutes at 60°C. and then, under the conditions of Example 3, a solution of the type defined above is projected in which the dyestuff has been replaced by twice its weight of a solution of a 20% dry extract of nitrocellulose (for example, Laque Lissanol L), and is left to dry for 25 minutes at 60°C. A brown on yellow contrast is obtained which does not give the effect of superposed layers.

EXAMPLE 6

In the formulation given in Example 5, the dyestuff used is replaced by the diarylguanidine salt of the sulphonated derivative of copper phthalocyanine.

The solution is applied by means of the gun at the rate of 95 g. per square metre on a butt coated with polyurethane-polyurea obtained by the process of Example 4 of French Pat. No. 1,427,722 and kept for a year.

After drying for 15 minutes at 60°C. the colourless solution used in Example 5 above is applied.

It is dried for 20 minutes at 60°C. and a leather is obtained having a transparent homogeneous turquoise colour which is fast to dry and wet rubbing.

EXAMPLE 7

On operating as in Example 6, but replacing the turquoise dyestuff by the sodium salt of the 1:2 chromium complex of 4'-nitro-2'-hydroxy-4-phenylazo-1-phenyl-3-methyl-5-hydroxypyrazole, a leather of equal fastness of a transparent red bordeaux colour is obtained

EXAMPLE 8

15 parts of the dyestuff consisting of the rhodamine salt of the 1:1 chromium complex of 1' [1-hydroxy-2-sulpho-4-nitrobenzene] - <5 azo 2> - [3-hydroxy-N-phenyl-2-butene-amide] are introduced into 1000 parts of a ternary mixture according to the invention comprising 250 parts of methanol, 500 parts of butyl acetate and 250 parts of dimethyl formamide. The solution of the dyestuff is immediate. The solution obtained is clear (Solution A).

On the other hand, 15 parts of the same dyestuff are introduced into 1000 parts of a known mixture comprising 375 parts of acetone, 500 parts of butyl acetate and 125 parts of the acetate of the monomethyl ether of ethyleneglycol. The mixture is agitated for 3 hours. A turbid solution is obtained (Solution B).

The solutions A and B are applied by means of a brush at the rate of 40 g. per square metre on panels of rigid polyurethane foam and on a leather coated with a layer of polyurethane-polyurea.

The solution A gives full-bodied colourations. With solution B the tinctorial yield is very poor in each of the two applications.

I claim:

1. A method for the coloration of a shaped article of polyurethane or a polymer based on a polyurethane, which comprises, applying a coloring composition in a single step to the surface a shaped article of said polyurethane or polymer based on a polyurethane at a temperature from ambient temperature up to 50° C, said coloring composition comprising 1 to 20% of a dyestuff, soluble in alcohols, consisting of either a metalliferous complex of an azo dyestuff of the 1:2 type, or a sulphonic salt of a dyestuff with an amine of high molecular weight, and 10 to 85% of a solvent containing an alcoholic function selected from the group consisting of methanol, ethanol, propanol, isopropanol, butanol, isobutanol, isoamyl alcohol, and mixtures thereof, and 1 to 35% of a polar and aprotic solvent selected from the group consisting of dimethylformamide, dimethylacetamide and mixtures thereof, and 1 to 50% of a hydroxy-free organic solvent selected from the group consisting of methyl, ethyl, propyl, isopropyl, butyl, amyl and isoamyl acetates of monomethyl and monoethyl ether of ethylene glycol.

2. A method as set forth in claim 1, wherein said coloring composition contains a plasticizer selected from the group consisting of camphor, castor oil, tricresyl phosphate, butyl phthalate, quaternary ammonium salts with a fatty radical, silicone oil, and fatty acids in an organic solution.

3. A method as set forth in claim 1, wherein after applying said coloring composition, said polyurethane or polymer based on a polyurethane is dried at a temperature from ambient temperature up to 60°C.

4. A method as set forth in claim 1, wherein said coloring composition contains from 0 to 2.5% of a film-forming material.

5. A method as set forth in claim 1, wherein said coloring composition contains from 0 to 10% of water and from 0 to 2.5% of a film-forming material.

* * * * *

UNITED STATES PATENT OFFICE
CERTIFICATE OF CORRECTION

Patent No. 3,901,648              Dated August 26, 1975

Inventor(s) Paul Georges Louis Arbaud          Page 1 of 2

It is certified that error appears in the above-identified patent and that said Letters Patent are hereby corrected as shown below:

Add Columns 7 and 8 as per attachment.

This Certificate applys to Grant ONLY

Signed and Sealed this

Tenth Day of May 1977

[SEAL]

Attest:

RUTH C. MASON
*Attesting Officer*

C. MARSHALL DANN
*Commissioner of Patents and Trademarks* prising 375 parts of acetone, 500 parts of butyl acetate and 125 parts of the acetate of the monomethyl ether of ethyleneglycol. The mixture is agitated for 3 hours. A turbid solution is obtained (Solution B).

The solutions A and B are applied by means of a brush at the rate of 40 g. per square metre on panels of rigid polyurethane foam and on a leather coated with a layer of polyurethane-polyurea.

The solution A gives full-bodied colourations. With solution B the tinctorial yield is very poor in each of the two applications.

I claim:

1. A method for the coloration of a shaped article of polyurethane or a polymer based on a polyurethane, which comprises, applying a coloring composition in a single step to the surface a shaped article of said polyurethane or polymer based on a polyurethane at a temperature from ambient temperature up to 50° C, said coloring composition comprising 1 to 20% of a dyestuff, soluble in alcohols, consisting of either a metalliferous complex of an azo dyestuff of the 1:2 type, or a sulphonic salt of a dyestuff with an amine of high molecular weight, and 10 to 85% of a solvent containing an alcoholic function selected from the group consisting of methanol, ethanol, propanol, isopropanol, butanol, isobutanol, isoamyl alcohol, and mixtures thereof, and 1 to 35% of a polar and aprotic solvent selected from the group consisting of dimethylformamide, dimethylacetamide and mixtures thereof, and 1 to 50% of a hydroxy-free organic solvent selected from the group consisting of methyl, ethyl, propyl, isopropyl, butyl, amyl and isoamyl acetates of monomethyl and monoethyl ether of ethylene glycol.

2. A method as set forth in claim 1, wherein said coloring composition contains a plasticizer selected from the group consisting of camphor, castor oil, tricresyl phosphate, butyl phthalate, quaternary ammonium salts with a fatty radical, silicone oil, and fatty acids in an organic solution.

3. A method as set forth in claim 1, wherein after applying said coloring composition, said polyurethane or polymer based on a polyurethane is dried at a temperature from ambient temperature up to 60°C.

4. A method as set forth in claim 1, wherein said coloring composition contains from 0 to 2.5% of a film-forming material.

5. A method as set forth in claim 1, wherein said coloring composition contains from 0 to 10% of water and from 0 to 2.5% of a film-forming material.

* * * * *